(12) United States Patent
Devarasetty

(10) Patent No.: US 11,089,495 B2
(45) Date of Patent: Aug. 10, 2021

(54) METHODS, SYSTEMS, AND COMPUTER READABLE MEDIA FOR TESTING RADIO ACCESS NETWORK NODES BY EMULATING BAND-LIMITED RADIO FREQUENCY (RF) AND NUMEROLOGY-CAPABLE UES IN A WIDEBAND 5G NETWORK

(71) Applicant: Keysight Technologies, Inc., Santa Rosa, CA (US)

(72) Inventor: Prasada Rao Devarasetty, Cary, NC (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 141 days.

(21) Appl. No.: 16/508,947

(22) Filed: Jul. 11, 2019

(65) Prior Publication Data
US 2021/0014709 A1  Jan. 14, 2021

(51) Int. Cl.
*H04W 24/06* (2009.01)
*H04W 72/08* (2009.01)
*H04W 72/04* (2009.01)

(52) U.S. Cl.
CPC ......... *H04W 24/06* (2013.01); *H04W 72/042* (2013.01); *H04W 72/048* (2013.01);
(Continued)

(58) Field of Classification Search
None
See application file for complete search history.

(56) References Cited

U.S. PATENT DOCUMENTS 5,465,393 A  11/1995  Frostrom et al.
5,530,917 A  6/1996  Andersson et al.
(Continued)

FOREIGN PATENT DOCUMENTS

EP  2262134 A2  12/2010
EP  2330843 A1  6/2011
(Continued)

OTHER PUBLICATIONS

Notice of Allowance and Fee(s) Due for U.S. Appl. No. 15/796,563 (dated Sep. 13, 2019).
(Continued)

*Primary Examiner* — Jenkey Van

(57) ABSTRACT

The subject matter described herein includes methods, systems, and computer readable media for testing radio access network nodes by emulating band-limited RF and numerology-capable UEs in wideband networks. One method includes storing, in a database, UE bandwidth and numerology capability profiles for modeling UEs with different bandwidth and numerology capabilities. The method further includes emulating UEs with different bandwidth and numerology capabilities by communicating, over an uplink interface, the bandwidth and numerology capability profiles to a radio access network node under test. The method further includes receiving, over a downlink interface and from the radio access network node under test, bandwidth part and numerology assignments for emulated UEs. The method further includes validating the UE bandwidth part and numerology assignments.

20 Claims, 6 Drawing Sheets

(52) U.S. Cl.
CPC ... *H04W 72/0446* (2013.01); *H04W 72/0453* (2013.01); *H04W 72/085* (2013.01)

(56) References Cited

U.S. PATENT DOCUMENTS

| | | | |
|---|---|---|---|
| 5,539,749 A | 7/1996 | Eul | |
| 5,561,841 A | 10/1996 | Markus | |
| 5,596,570 A | 1/1997 | Soliman | |
| 5,867,791 A | 2/1999 | Chambert | |
| 6,018,521 A | 1/2000 | Timbs et al. | |
| 6,163,547 A | 12/2000 | De Vriendt et al. | |
| 6,292,667 B1 | 9/2001 | Wallentin et al. | |
| 6,308,065 B1 | 10/2001 | Molinari et al. | |
| 6,374,112 B1 | 4/2002 | Widegren et al. | |
| 6,445,683 B1 | 9/2002 | Nobuyasu et al. | |
| 6,456,675 B2 | 9/2002 | Wagner et al. | |
| 6,466,556 B1 | 10/2002 | Boudreaux | |
| 6,490,315 B2 | 12/2002 | Katz et al. | |
| 6,519,461 B1 | 2/2003 | Andersson et al. | |
| 6,587,457 B1 | 7/2003 | Mikkonen | |
| 6,594,240 B1 | 7/2003 | Chuah et al. | |
| 6,594,241 B1 | 7/2003 | Malmlöf | |
| 6,771,957 B2 | 8/2004 | Chitrapu | |
| 7,558,565 B2 | 7/2009 | Miller et al. | |
| 7,889,663 B1 | 2/2011 | Wright et al. | |
| 8,019,385 B1 | 9/2011 | Mansour et al. | |
| 8,050,338 B2 | 11/2011 | Wilhelmsson | |
| 8,781,797 B1 | 7/2014 | Oltman et al. | |
| 8,793,117 B1 | 7/2014 | Varshney et al. | |
| 9,125,068 B2 | 9/2015 | Balkwill | |
| 9,351,186 B2 | 5/2016 | Devarasetty et al. | |
| 9,432,859 B2 | 8/2016 | Devarasetty et al. | |
| 9,444,562 B2 | 9/2016 | Devarasetty et al. | |
| 9,596,166 B2 | 3/2017 | Iyer et al. | |
| 10,142,865 B2 | 11/2018 | Devarasetty | |
| 10,182,355 B1 | 1/2019 | Yan et al. | |
| 10,542,443 B2 | 1/2020 | Devarasetty | |
| 2002/0012380 A1 | 1/2002 | Hottinen et al. | |
| 2002/0021698 A1 | 2/2002 | Lee et al. | |
| 2002/0183053 A1 | 12/2002 | Gopalakrishna et al. | |
| 2003/0100299 A1 | 5/2003 | Ko et al. | |
| 2003/0228853 A1 | 12/2003 | Kazakevich et al. | |
| 2004/0196804 A1 | 10/2004 | Love et al. | |
| 2004/0214564 A1 | 10/2004 | Rosen et al. | |
| 2005/0130645 A1 | 6/2005 | Albert Dobson et al. | |
| 2006/0012388 A1 | 1/2006 | Lin et al. | |
| 2006/0122814 A1 | 6/2006 | Beens et al. | |
| 2006/0229018 A1 | 10/2006 | Mlinarsky et al. | |
| 2006/0234636 A1 | 10/2006 | Miller et al. | |
| 2006/0258320 A1 | 11/2006 | Huang | |
| 2006/0262880 A1 | 11/2006 | Mizuta et al. | |
| 2006/0276195 A1 | 12/2006 | Nordling | |
| 2008/0147370 A1 | 6/2008 | Sjerling | |
| 2008/0310490 A1 | 12/2008 | Jitsuno et al. | |
| 2009/0046569 A1 | 2/2009 | Chen et al. | |
| 2009/0109926 A1 | 4/2009 | Meylan | |
| 2009/0163212 A1 | 6/2009 | Hall et al. | |
| 2009/0268828 A1 | 10/2009 | Roberts | |
| 2010/0004015 A1 | 1/2010 | Nilsson et al. | |
| 2010/0075678 A1 | 3/2010 | Akman et al. | |
| 2011/0053516 A1 | 3/2011 | Harteneck | |
| 2011/0142115 A1 | 6/2011 | Wang et al. | |
| 2011/0199985 A1 | 8/2011 | Cai et al. | |
| 2011/0217937 A1 | 9/2011 | Cook | |
| 2011/0223900 A1 | 9/2011 | Yu et al. | |
| 2011/0270567 A1 | 11/2011 | Mow et al. | |
| 2011/0287721 A1 | 11/2011 | Haran | |
| 2011/0294497 A1 | 12/2011 | Hedlund et al. | |
| 2011/0299570 A1 | 12/2011 | Reed | |
| 2011/0310745 A1 | 12/2011 | Goria et al. | |
| 2012/0014333 A1 | 1/2012 | Ji et al. | |
| 2012/0100813 A1 | 4/2012 | Mow et al. | |
| 2012/0121038 A1 | 5/2012 | Liu et al. | |
| 2012/0150521 A1 | 6/2012 | Balkwill | |
| 2012/0269143 A1 | 10/2012 | Bertrand et al. | |
| 2012/0269278 A1 | 10/2012 | Onggosanusi et al. | |
| 2012/0309323 A1 | 12/2012 | Guo et al. | |
| 2013/0040683 A1 | 2/2013 | Siomina et al. | |
| 2013/0044610 A1 | 2/2013 | Zhao et al. | |
| 2013/0058219 A1 | 3/2013 | Liu | |
| 2013/0143503 A1 | 6/2013 | Li et al. | |
| 2013/0155872 A1 | 6/2013 | Subramanian et al. | |
| 2013/0155878 A1 | 6/2013 | Deng et al. | |
| 2013/0184023 A1 | 7/2013 | Asokan et al. | |
| 2013/0208603 A1 | 8/2013 | Choi et al. | |
| 2013/0235727 A1 | 9/2013 | Campbell et al. | |
| 2013/0303089 A1 | 11/2013 | Wang et al. | |
| 2014/0086075 A1* | 3/2014 | Asokan | H04W 24/06 370/252 |
| 2014/0321303 A1 | 10/2014 | Iyer et al. | |
| 2014/0341052 A1 | 11/2014 | Devarasetty et al. | |
| 2015/0031310 A1* | 1/2015 | Devarasetty | H04B 17/0085 455/67.14 |
| 2015/0117225 A1* | 4/2015 | Devarasetty | H04B 17/0085 370/241 |
| 2015/0264590 A1* | 9/2015 | Michl | H04B 17/11 455/67.14 |
| 2016/0014625 A1* | 1/2016 | Devarasetty | H04L 25/0228 370/252 |
| 2016/0366604 A1* | 12/2016 | Devarasetty | H04W 74/002 |
| 2017/0311186 A1* | 10/2017 | Devarasetty | H04L 27/2636 |
| 2018/0034559 A1 | 2/2018 | Foegelle | |
| 2018/0293338 A1 | 10/2018 | Braun | |
| 2019/0132753 A1 | 5/2019 | Devarasetty | |
| 2019/0141695 A1* | 5/2019 | Babaei | H04L 5/001 |

FOREIGN PATENT DOCUMENTS

| | | |
|---|---|---|
| EP | 2533572 A1 | 12/2012 |
| EP | 2 989 820 B1 | 1/2018 |
| EP | 2 997 679 B1 | 8/2018 |
| EP | 3 063 887 B1 | 4/2019 |
| JP | 2009-065488 A | 3/2009 |
| JP | 2011-193124 A | 9/2011 |
| KR | 10-2000-0072934 A | 12/2000 |
| KR | 10-2008-0066321 A | 7/2008 |
| KR | 10-2011-0085274 A | 7/2011 |
| KR | 10-2011-0112502 A | 10/2011 |
| WO | WO 02/098151 A1 | 12/2002 |
| WO | WO 2006/048742 A1 | 12/2002 |
| WO | WO 2012/117147 A1 | 9/2012 |
| WO | WO 2012/150894 A1 | 11/2012 |
| WO | WO 2014/176376 A1 | 10/2014 |
| WO | WO 2014/186747 A1 | 11/2014 |
| WO | WO 2015/017082 A1 | 2/2015 |
| WO | WO 2015/065900 A1 | 5/2015 |

OTHER PUBLICATIONS

Applicant-Initiated Interview Summary for U.S. Appl. No. 15/796,563 (dated Jul. 26, 2019)

Advisory Action for U.S. Appl. No. 15/796,563 (dated Jun. 17, 2019).

Final Office Action for U.S. Appl. No. 15/796,563 (dated Apr. 4, 2019).

Non-Final Office Action for U.S. Appl. No. 15/796,563 (dated Nov. 21, 2018).

Decision to grant a European patent pursuant to Article 97(1) EPC for European Patent Application Serial No. 14797124.6(dated Aug. 2, 2018).

Communication of extended European Search Report for European Patent Application No. 14797124.6 (dated Nov. 28, 2016).

Notice of Allowance and Fee(s) Due for U.S. Appl. No. 14/229,789 (dated Oct. 27, 2016).

Communication of extended European Search Report for European Patent Application No. 14787952.2 (dated Oct. 24,2016).

Advisory Action, Examiner-Initiated Interview Summary, & AFCP 2.0 Decision for U.S. Appl. No. 14/229,789 (dated Jul. 25, 2016).

Applicant-Initiated Interview Summary for U.S. Appl. No. 14/229,789 (dated Jul. 11, 2016).

(56) References Cited

OTHER PUBLICATIONS

Final Office Action for U.S. Appl. No. 14/229,789 (dated May 6, 2016).
Communication of European publication number and information on the application of Article 67(3) EPC for European Application No. 14797124.6 (dated Feb. 24, 2016).
Communication of European publication number and information on the application of Article 67(3) EPC for European Application No. 14787952.2 (dated Feb. 3, 2016).
Notice of Allowance and Fee(s) Due for U.S. Appl. No. 14/280,319 (dated Jan. 13, 2016).
Non-Final Office Action for U.S. Appl. No. 14/280,319 (dated Sep. 15, 2015).
Non-Final Office Action for U.S. Appl. No. 14/229,789 (dated Sep. 15, 2015).
Supplemental Notice of Allowability for U.S. Appl. No. 13/154,166 (dated Jul. 28, 2015).
Corrected Notice of Allowability for U.S. Appl. No. 13/154,166 (dated Apr. 24, 2015).
Notice of Allowance and Fee(s) Due for U.S. Appl. No. 13/154,166 (dated Apr. 13, 2015).
Non-Final Office Action for U.S. Appl. No. 13/154,166 (dated Oct. 28, 2014).
Notification of Transmittal of the International Search Report and the Written Opinion of the International Searching Authority for International Application No. PCT/US2014/038462 (dated Sep. 24, 2014).
Notification of Transmittal of the International Search Report and the Written Opinion of the International Searching Authority, or the Declaration for International Application No. PCT/US2014/035204 (dated Aug. 22, 2014).
Notice of Allowance and Fee(s) Due for U.S. Appl. No. 13/154,166 (dated Jun. 2, 2014).
Applicant-Initiated Interview Summary for U.S. Appl. No. 13/154,166 (dated Apr. 28, 2014).
Final Office Action for U.S. Appl. No. 13/154,166 (dated Mar. 3,2014).
Over View of 3GPP Release 10 V0.2.0 (Mar. 2014).
Non-Final Office Action for U.S. Appl. No. 13/154,166 (dated Aug. 19, 2013).
"LTE and LTE-A Products," Part No. 46891/580, Issue 3, pp. 1-16 (Jan. 2013).
"Infrastructure Test System, TM500 LTE-A, 3GPP LTE Test,"Part No. 46900/003, Issue 1, pp. 1-8 (Oct. 2012).
"Aeroflex Launches TM500 LTE-A Test Mobile," http://www.evaluationengineering.com/news/aeroflex-launches-tm500-lte-a-test-mobile.php, p. 1 (Jul. 19, 2012).
Dahlman et al., "10.4.9: Blind Decoding of PDCCHs," 4G LTE / LTE-Advanced for Mobile Broadband, pp. 199-202 (2011).
Ikuno et al., "System level simulation of LTE networks," 2010 IEEE 71st Vehicular Technology Conference: VTC2010-Spring, (May 16-19, 2010).
"IxCatapult Chassis," http://www.ixiacom.com/products/display?skey=ch_ixcatapult, pp. 1-2 (Downloaded from the Internet Apr. 14, 2010).
"Wireless Network Testing," Ixia, 915-2623-01 Rev A, pp. 1-18 (Jan. 2010).
"Wireless Network Testing," Ixia, 915-2622-01 Rev A, pp. 1-16 (Janp 2010).
Xiao et al., "IMS Network Deployment Cost Optimization Based on Flow-Based Traffic Model," IEEE/IFIP Network Operations and Management Symposium—NOMS 2010, pp. 232-239 (2010).
"DCT2000 LTE UE Simulation API Manual," Release 17.1, Catapult Communications, pp. 1-106 (May 2009).
"Catapult Communications Announces High-Capacity LTE UE Simulation Test System," Catapult Communications Corporation, pp. 1-2 (Feb. 9, 2009).
"Network Topology," http://web.archive.org/web/20081219235147/http://en.wikipedia.org/wiki/Network_topology, pp. 1-9 (Dec. 19, 2008).
"LTE (Long Term Evolution) Testing Systems," http://www.catapult.com/technologies/tech_lte.htm, pp. 1-2 (Jun. 26, 2008).
Non-Final Office Action for U.S. Appl. No. 09/866,955 (dated Dec. 31, 2003).
Non Final Office Action for U.S. Appl. No. 09/866,955 (dated Dec. 31, 2013).
Notification of Transmittal of the International Search Report or the Declaration for International Application No. PCT/US02/16638 (dated Oct. 29, 2002).
"Universal Mobile Telecommunications (UMTS) Protocols and Protocol Testing," International Engineering Consortium, http://www.iec.org/online/tutorials/UMTS/topic04.html, pp. 1-3 (2001).
"Universal Mobile Telecommunications System (UMTS) Protocols and Protocol Testing," International Engineering Consortium, http://www.iec.org/online/tutorials/UMTS/topic02.html, pp. 1-7 (2001).
"Universal Mobile Telecommunications System (UMTS); UTRAN Iub Interface User Plane Protocols for Common Transport Channel Data Streams (3GPP TS 25.435 version 3.5.0 Release 1999)," ETSI TS 125 435 V3.5.0 (Dec. 2000).
"Universal Mobile Telecommunications System (UMTS); UTRAN Iub Interface Data Transport and Transport Signalling for Common Transport Channel Data Streams (3GPP TS 25.434 version 3.4.0 Release 1999)," ETSI TS 125 434 V3.4.0 (Dec. 2000).
"Universal Mobile Telecommunications System (UMTS); UTRAN Iub Interface NBAP Signalling (3GPP TS 25.433 version 3.4.1 Release 1999)" ETSI TS 125 433 V3.4.1 (Dec. 2000).
"Universal Mobile Telecommunications System (UMTS); UTRAN Iub/Iur Interface User Plane Protocol for DCH Data Streams (3GPP TS 25.427 version 3.5.0 Release 1999),"ETSI TS 125 427 V3.5.0 (Dec. 2000).
"Universal Mobile Telecommunications System (UMTS); UTRAN Iur and Iub Interface Data Transport; Transport Signalling for DCH Data Streams (3GPP TS 25.426 version 3.5.0 Release 1999)," ETSI TS 125 426 V3.5.0 (Dec. 2000).
"Universal Mobile Telecommunications System (UMTS); UTRAN Overall Description (3GPP TS 25.401 version 3.5.0 Release 1999)," ETSI TS 125 401 V3.5.0 (Dec. 2000).
"Universal Mobile Telecommunications System (UMTS); RRC Protocol Specification (3GPP TS 25.331 version 3.5.0 Release 1999)," ETSI TS 125 331 V3.5.0 (Dec. 2000).
"Universal Mobile Telecommunications System (UMTS); RLC protocol specification (3GPP TS 25.322 version 3.5.0 Release 1999)," ETSI TS 125 322 V3.5.0 (Dec. 2000).
"Universal Mobile Telecommunications System (UMTS); MAC protocol specification (3GPP TS 25.321 version 3.5.0 Release 1999)," ETSI TS 125 321 V3.6.0 (Dec. 2000).
Kwon et al., "Performance Comparison of RAN-CN Protocol Stacks in IMT-2000 Networks," IEEE, pp. 2370-2374 (2000).
Weiss, "Designing Macroscopic Diversity Cellular Systems." IEEE, pp. 2054-2058 (1999).
Lee et al., "Effect of Soft and Softer Handoffs on CDMA System Capacity," IEEE Transactions on Vehicular Technology, vol. 47, No. 3, pp. 830-841 (Aug. 1998).
Marchent et al., "Handover and Macro Diversity for 3rd Generation Mobile Systems within ATM Fixed Networks," IEEE, pp. 1151-1155 (1996).
Notice of Allowance and Fee(s) Due for U.S. Appl. No. 15/134,338 (dated Mar. 27, 2018).
Commonly-assigned, co-pending U.S. Appl. No. 15/796,563 for "Methods, Systems, and Computer Readable Media for Testing Long Term Evolution (LTE) Air Interface Device Using Emulated Noise in Unassigned Resource Blocks (RBs)," (Unpublished, filed Oct. 27, 2017).
Communication of the extended European search report for European Application No. 14857488.2 (dated May 16 2017).
Communication of the extended European search report for European Application No. 14832004.7 (dated Feb. 8, 2017).
Communication of European publication number and information on the application of Article 67(3) EPC for European Application No. 14857488.2 (dated Aug. 10, 2016).
Supplemental Notice of Allowability for U.S. Appl. No. 14/049,193 (dated Jul. 18 2016).

(56) References Cited

OTHER PUBLICATIONS

Communication of European publication number and information on the application of Article 67(3) EPC for European Application No. 14832004.7 (dated May 11, 2016).
Notice of Allowance and Fee(s) Due for U.S. Appl. No. 14/069,215 (dated Apr. 29 2016).
Notice of Allowance and Fee(s) Due & Applicant-Initiated Interview Summary for U.S. Appl. No. 14/049,193 (dated Apr. 5, 2016).
"Rayleigh fading," Wikipedia, https://en.wikipedia.org/wiki/Rayleigh_fading, pp. 1-5 (Jan. 29, 2016).
Final Office Action for U.S. Appl. No. 14/069,215 (dated Dec. 22, 2015).
Final Office Action for U.S. Appl. No. 14/049,193 (dated Dec. 10, 2015).
Non-Final Office Action for U.S. Appl. No. 14/049,193 (dated Jun. 30, 2015).
Non-Final Office Action for U.S. Appl. No. 14/069,215 (dated Apr. 29, 2015).
Notification of Transmittal of the International Search Report and the Written Opinion of the International Searching Authority, or the Declaration for International Application No. PCT/US2014/062399 (dated Jan. 20, 2015).
Notification of Transmittal of the International Search Report and the Written Opinion of the International Searching Authority, or the Declaration for PCT International Application No. PCT/US2014/045647 (dated Nov. 5, 2014).
Zhong et al., "The MITRE Tactical Channel Emulation System," The MITRE Corporation, Case 13-1750 (May 2013).
Sur et al, "Doppler Shift Impact on the MIMO OFDM System in Vehicular Channel Condition," I.J. Information Technology and Computer Science, vol. 8, pp. 57-62 (2012).
Patriciello et al., "An E2E simulator for 5G NR networks," Simulation Modelling Practice and Theory, vol. 96, pp. 1-19 (2019).
"5G/NR—Frame Structure," ShareTechnote, pp. 1-22 (Jul. 8, 2019).
Giordani et al., "A Tutorial on Beam Management for 3GPP NR at mmWave Frequencies," arXiv:1804.01908v1 [cs.NI], pp. 1-22 (Apr. 5, 2018).
Keysight Technologies, "Testing 5G: Data Throughput—Application Note," Keysight, pp. 1-24 (Dec. 7, 2017).
Campos, "Understanding the 5G NR Physical Layer," Keysight Technologies, pp. 1-111 (Nov. 1, 2017).

\* cited by examiner

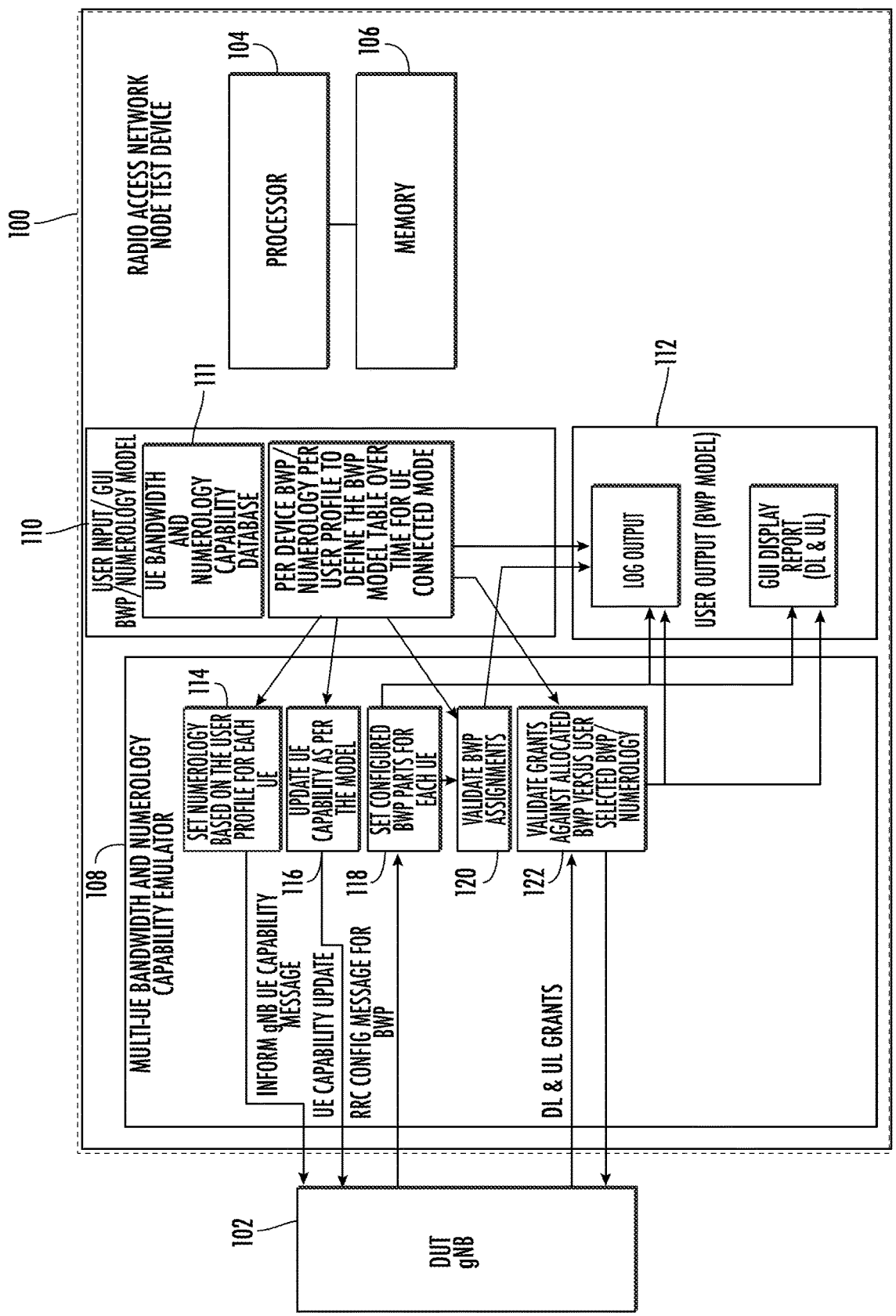

METHODS, SYSTEMS, AND COMPUTER READABLE MEDIA FOR TESTING RADIO ACCESS NETWORK NODES BY EMULATING BAND-LIMITED RADIO FREQUENCY (RF) AND NUMEROLOGY-CAPABLE UES IN A WIDEBAND 5G NETWORK

TECHNICAL FIELD

The subject matter described herein relates to testing radio access network devices, such as g-nodeBs (gNBs). More particularly, the subject matter described herein relates to emulating band-limited RF and numerology-capable UEs in wideband networks and using the emulated UEs to test radio access network devices.

BACKGROUND

In wideband networks, such as 5G mobile networks, the available frequency band for communication is extended from 20 MHz used in long term evolution (LTE) networks to 400 MHz used in 5G networks, which can be aggregated to 800 MHz. To prevent UEs from having to search and use the entire 400 MHz bandwidth for radio signals intended for the UEs from the network, 5G has defined the notion of a bandwidth part (BWP) where each UE is assigned a maximum of 4 bandwidth parts per downlink timeslot. The bandwidth parts define frequency ranges allocated to the UE during each timeslot. Only one bandwidth part is active at a given time. As a result, the UE is only expected to examine a portion of the overall 5G bandwidth when detecting signals transmitted from the network.

The bandwidth parts assigned to the UE change over time. For example, a UE may advertise its bandwidth capabilities and current needs to the gNB at an initial time. The gNB may then assign bandwidth parts to the UE based on the advertised capabilities and needs. The UE may subsequently change its capabilities or needs and advertise the updated capabilities or needs to the gNB. The gNB may subsequently change the allocation of bandwidth parts to the UE. It is desirable to be able to test the response of the radio access network node, such as a gNB, to UEs with different bandwidth part needs and capabilities.

In addition to bandwidth parts, 5G network standards define the concept of numerology, where numerology defines the spacing between subcarriers and the length of each timeslot. In LTE networks, there is only one type of subcarrier spacing and that spacing is 15 kHz between subcarriers. In new radio (NR) or 5G networks, subcarrier spacings can vary with numerology, which defines different values for subcarrier spacing and timeslot lengths. Table 1 shown below illustrates different numerology values and corresponding subcarrier spacings and cyclic prefix types.

TABLE 1

Numerology Values, Corresponding Subcarrier Spacings, and Cyclic Prefix Types

| $\mu$ | $\Delta f = 2^\mu \cdot 15[kHz]$ | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 the values of $\mu$ in the first column are referred to as numerology values. Thus, $\mu=0$ is referred to as numerology zero, $\mu=1$ is referred to as numerology 1, etc. It can be seen that for different values of $\mu$, the subcarrier spacing is equal to $2^\mu$ times 15 kHz. Stated differently, for increasing values of $\mu$, the subcarrier spacing doubles from the previous subcarrier spacing. Current test systems designed for 3G and 4G networks are incapable of testing different UE numerologies because 3G and 4G networks only have a single subcarrier spacing.

Accordingly, in light of these and other difficulties, there exists a need for methods, systems, and computer readable media for testing radio access network nodes by emulating band-limited RF and numerology-capable UEs in a wideband network.

SUMMARY

The subject matter described herein includes methods, systems, and computer readable media for testing radio access network nodes by emulating band-limited RF and numerology-capable in wideband networks. One method includes storing, in a database, UE bandwidth and numerology capability profiles for modeling UEs with different bandwidth and numerology capabilities. The method further includes emulating UEs with different bandwidth and numerology capabilities by communicating the bandwidth and numerology capability profiles from the database to a radio access network node under test. The method further includes receiving, from the radio access network node under test, bandwidth part and numerology assignments for emulated UEs. The method further includes validating the UE bandwidth part and numerology assignments.

According to another aspect of the subject matter described herein, storing the bandwidth and numerology capability profiles includes storing different bandwidth and numerology capability profiles for different emulated UEs.

According to yet another aspect of the subject matter described herein, storing the different bandwidth and numerology capability profiles includes a bandwidth and numerology capability profile for a single emulated UE or a group of UEs or multiple groups of UE's in which the bandwidth capability of the emulated UE or group of UEs or multiple groups of UE's changes with time.

According to yet another aspect of the subject matter described herein, validating the UE bandwidth and numerology assignments includes comparing the assignments to bandwidth capabilities communicated to the radio access network node under test.

According to yet another aspect of the subject matter described herein, the method includes receiving bandwidth part grants from the radio access network node under test and validating the grants.

According to yet another aspect of the subject matter described herein, validating the grants includes decoding downlink control information in downlink signals received from the radio access network node under test, identifying bandwidth parts and assigned to the emulated UEs, and determining whether the bandwidth parts identified from the downlink control information correspond to the UE bandwidth assignments.

According to yet another aspect of the subject matter described herein, the method includes analyzing downlink signals to determine whether downlink control information is transmitted outside of allocated bandwidth parts.

According to yet another aspect of the subject matter described herein, the method includes identifying a set of bandwidth parts assigned to an emulated UE for a downlink and uplink timeslot, identifying an active bandwidth part for the downlink and uplink timeslot, detecting switching of the active bandwidth part for a subsequent downlink and uplink timeslot, and generating an indication of the switching of the active bandwidth part.

According to yet another aspect of the subject matter described herein, emulating UEs with different bandwidth part and numerology capabilities includes emulating plural UEs with different numerology capabilities.

According to yet another aspect of the subject matter described herein, the radio access network node under test comprises a g-node B (gNB).

According to yet another aspect of the subject matter described herein, a system for testing a radio access network node using emulated UEs with varying bandwidth and numerology capabilities includes a radio access network node test device including at least one processor and a memory. The system further includes a database of emulated UE bandwidth and numerology capability profiles stored in the memory for modeling UEs with different bandwidth and numerology capabilities. The system further includes a multi-UE bandwidth and numerology capability emulator implemented by the at least one processor for emulating plural UEs with different bandwidth part and numerology capabilities by communicating, over an uplink interface, the bandwidth and numerology capability profiles to a radio access network node under test, receiving, over a downlink interface, UE bandwidth part and numerology assignments from the radio access network node under test, and validating the UE bandwidth part and numerology assignments with respect to the bandwidth and numerology capabilities communicated to the radio access network node under test.

According to yet another aspect of the subject matter described herein, the database is configured to store different bandwidth and numerology capability profiles for different emulated UEs.

According to yet another aspect of the subject matter described herein, the database is configured to store a bandwidth and numerology capability profile for a single emulated UE or a group of UEs or multiple groups of UE's in which the bandwidth capability of the emulated UE or group of UEs or multiple groups of UE's changes with time and the multi-UE bandwidth and numerology capability emulator is configured to use the stored profile to emulate a single UE or group of UEs having a bandwidth capability that changes with time.

According to yet another aspect of the subject matter described herein, validating the UE bandwidth and numerology assignments includes comparing the assignments to bandwidth capabilities communicated to the radio access network node under test.

According to yet another aspect of the subject matter described herein, the multi-UE bandwidth and numerology capability emulator is configured to receive bandwidth part grants from the radio access network node under test and validate the grants.

According to yet another aspect of the subject matter described herein, the multi-UE bandwidth and numerology capability emulator is configured to decode downlink control information in downlink signals received from the radio access network node under test, identify bandwidth parts and assigned to the emulated UEs, and determine whether the bandwidth parts identified from the downlink control information correspond to the UE bandwidth assignments.

According to yet another aspect of the subject matter described herein, the multi-UE bandwidth and numerology capability emulator is configured to analyze downlink signals to determine whether downlink control information is transmitted outside of allocated bandwidth parts.

According to yet another aspect of the subject matter described herein, the multi-UE bandwidth and numerology capability emulator is configured to identify a set of bandwidth parts assigned to an emulated UE for a downlink and uplink timeslot, identify an active bandwidth part for the downlink and uplink timeslot, detect switching of the active bandwidth part for a subsequent timeslot, and generate an indication of the switching of the active bandwidth part.

According to yet another aspect of the subject matter described herein, the multi-UE bandwidth and numerology capability emulator is configured to emulate plural UEs with different numerology capabilities.

According to yet another aspect of the subject matter described herein, a non-transitory computer readable medium having stored thereon executable instructions that when executed by the processor of a computer control the computer to perform steps is provided. The steps include storing, in a database, emulated UE bandwidth and numerology capability profiles in memory for modeling UEs with different bandwidth and numerology capabilities. The steps further include emulating plural UEs with different bandwidth part and numerology capabilities by communicating, over an uplink interface, the bandwidth and numerology capability profiles to a radio access network node under test. The steps further include receiving, over a downlink interface and from the radio access network node under test, UE bandwidth part and numerology assignments. The steps further include validating the UE bandwidth part and numerology assignments with respect to the bandwidth and numerology capabilities communicated to the radio access network node under test.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 1 is a block and flow diagram illustrating a multi-UE bandwidth part and numerology capability emulator and steps for testing a gNB by emulating different UEs with different numerology and bandwidth profiles;

DETAILED DESCRIPTION

Figure 2A:
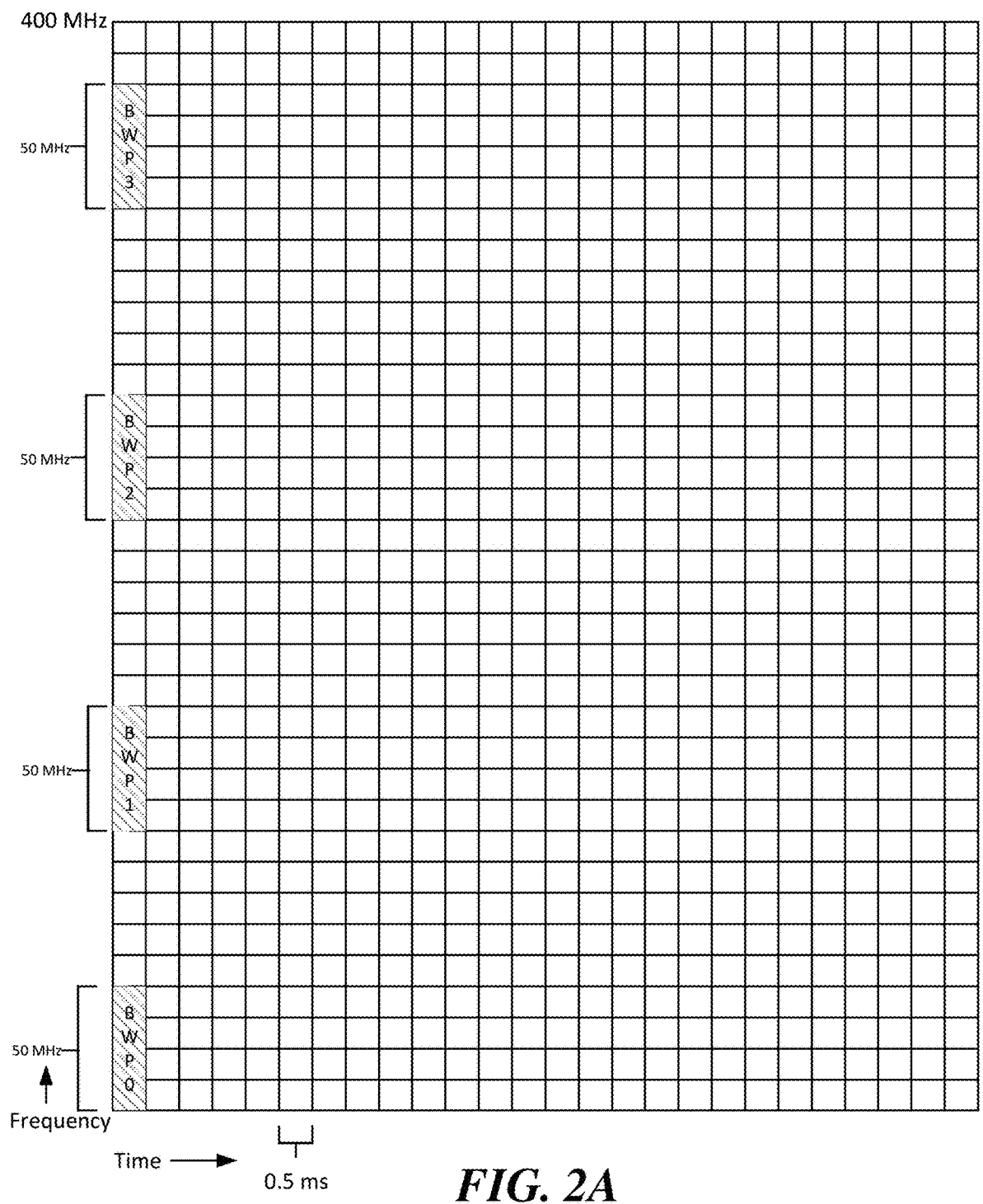
FIG. 2A is a diagram of a downlink resource grid illustrating an exemplary bandwidth part assignment to an emulated UE.

The subject matter described herein relates to methods, systems, and computer readable media for testing a radio access network node by emulating UEs with different bandwidth and numerology capabilities in a wideband network. FIG. 1 is a block and flow diagram illustrating a multi-UE bandwidth and numerology capability emulator for testing a radio access network node under test. In FIG. 1, a radio access network node test device 100 includes various components for testing a radio access network node, such as a gNB (hereinafter, DUT 102). In the illustrated example, radio access network node test device 100 includes at least one processor 104 and a memory 106. A multi-UE bandwidth and numerology capability emulator 108 may be a software component residing in memory 106 and executed by processor 104 to test the capabilities of DUT 102 with respect to UEs with different bandwidth and numerology capabilities. Radio access network node test device 100 further includes a UE bandwidth part and numerology model 110 that models UEs with different bandwidth and numerology capabilities based on model parameters stored in memory 106 and/or input by the user. Model 110 may include a UE bandwidth and numerology capability database 111 that stores bandwidth and numerology profiles of emulated UEs. Radio access network node test device 100 further includes an output module 112 that outputs results of testing the response of DUT 102 to emulated UEs with different bandwidth and numerology capabilities.

Steps 114-122 in FIG. 1 illustrate the functionality performed by the various components illustrated in FIG. 1. Referring to step 114, multi-UE bandwidth and numerology capability emulator 108 sets UE numerology for each emulated UE based on the user profiles stored in UE bandwidth and numerology capability database 111. UE bandwidth and numerology capability database 111 contains per device BWP and numerology configurations that may cause the numerology and bandwidth capabilities of the emulated UEs to change over time. Table 2 shown below illustrates exemplary profile data that may be stored in database 111.

TABLE 2

Model of UE Bandwidth Capabilities

| UE | BW | Time | BW | Time | BW | Time | ... |
|---|---|---|---|---|---|---|---|
| UE 1 to 5 | 30 | 50 | 100 | 60 | 10 | 70 | |
| UE 6 to 20 | 20 | 60 | 50 | 70 | 10 | 80 | ... |
| UE 21 to 22 | 400 | 50 | 200 | 80 | 15 | 100 | ... |
| ... | | | | | | | |
| UE N to M | 20 | 20 | 10 | 70 | 15 | 100 | ... |

In Table 2, the first column represents groups of emulated UEs. The second column represents the bandwidth capability of the UEs. The bandwidth capability defines the frequency bandwidth that each emulated UE or group of emulated UEs is capable of using for transmission and reception. For example, a bandwidth capability of 30 may indicate that the emulated UEs are capable of transmitting and receiving in units of 30 MHz of carrier bandwidth. The third column represents a duration of time that the bandwidth capabilities in the first column will be emulated. For example, the time of 50 and the bandwidth capability of 30 in the first row of Table 2 indicates that for UEs 1 through 5, a bandwidth capability of 30 MHz will be emulated for 50 timeslots. The fourth column represents a new bandwidth capability that will be modeled by the emulated UEs. The fifth column represents a time or duration for the bandwidth capabilities in the third column. Continuing with the model for UEs 1 through 5, after the fifth timeslot, the bandwidth capability of UEs 1 through 5 will change to 100 MHz and will remain at 100 MHz for 60 timeslots. The sixth column represents a subsequent change in the bandwidth capabilities of the modeled UEs. The seventh column represents a time or duration for the bandwidth capabilities in the sixth column. For UEs 1 through 5, after the eleventh timeslot, the bandwidth capabilities will change to 10 MHz and remain at 10 MHz for 70 timeslots. Thus, each row in the table represents a bandwidth capability profile that may be modeled by emulated UEs where the bandwidth capability profile changes over time.

In addition to changing the bandwidth capability profile, the numerology for each UE may change over time. For example, an emulated UE may change its numerology over time as the UE's needs change. Referring again to Table 1, a UE may initially operate at numerology 0, corresponding to a subcarrier spacing of 15 kHz. If the UE's communication needs subsequently change, the UE may change its numerology to numerology 1, which corresponds to a subcarrier spacing of 30 kHz. Multi-UE and bandwidth part numerology capability emulator 108 may be capable of emulating UEs that operate at different numerologies and that change in numerology over time.

Returning to FIG. 1, after the numerology and bandwidth capabilities of each emulated UE are set according to the parameters in bandwidth and numerology capability database 111, multi-UE bandwidth and numerology capability emulator 108 emulates plural UEs with different bandwidth and numerology capabilities by communicating the capabilities to DUT 102 over an uplink interface used for such communications. If the UE bandwidth and/or numerology capability changes over time, in step 116, multi-UE bandwidth and numerology capability emulator 108 may inform DUT 102 of the updated capabilities over the uplink interface.

Once DUT 102 receives notification of UE bandwidth and numerology capabilities, DUT 102 sends bandwidth part and numerology assignments for each emulated UE in a radio resource control (RRC) config message. As indicated above, an emulated UE may include up to 4 downlink bandwidth parts. After receiving the RRC config message, multi-UE bandwidth and numerology capability emulator 108 sets the configured bandwidth parts and numerology capabilities for each UE in step 118.

In step 120, multi-UE bandwidth and numerology capability emulator 108 validates bandwidth part and numerology assignments. Validating bandwidth part and numerology assignments may include determining whether the bandwidth parts assigned by DUT 102 correspond to the bandwidth part and numerology capabilities communicated to DUT 102 by multi-UE bandwidth part and numerology capability emulator 108 for a given UE. Such validation may be performed by comparing the bandwidth part and numerology assignments received in the RRC config message to the bandwidth part and numerology capabilities communicated to DUT 102 in the initial UE capability advertisement message in step 114 or the UE capability update message in step 120. If the assigned bandwidth parts and numerologies match the advertised or requested capabilities, multi-UE bandwidth part and numerology capability emulator 108 may indicate that the bandwidth part and numerology assignments were successfully validated. If the assigned bandwidth parts and/or numerologies do not match the advertised capabilities, multi-UE bandwidth part and numerology capability emulator 108 may indicate that the bandwidth part and numerology assignments were not successfully validated.

In step 122, multi-UE bandwidth and numerology capability emulator 108 receives downlink and uplink bandwidth part grants and validates the grants against the bandwidth part and numerology assignments. Multi-UE bandwidth and numerology capability emulator 108 may identify bandwidth grants from downlink control information (DCI) received from DUT 102. The downlink control information can be decoded from the downlink signal received from DUT 102 to identify the bandwidth parts and numerologies assigned to each UE. If the grants match the advertised capabilities, multi-UE bandwidth part and numerology capability emulator 108 may indicate successful validation of the grants. If the bandwidth part and numerology grants do not match the advertised capabilities, multi-UE bandwidth part and numerology capability emulator 108 may indicate unsuccessful validation of the bandwidth part and numerology grants.

Figure 2B:
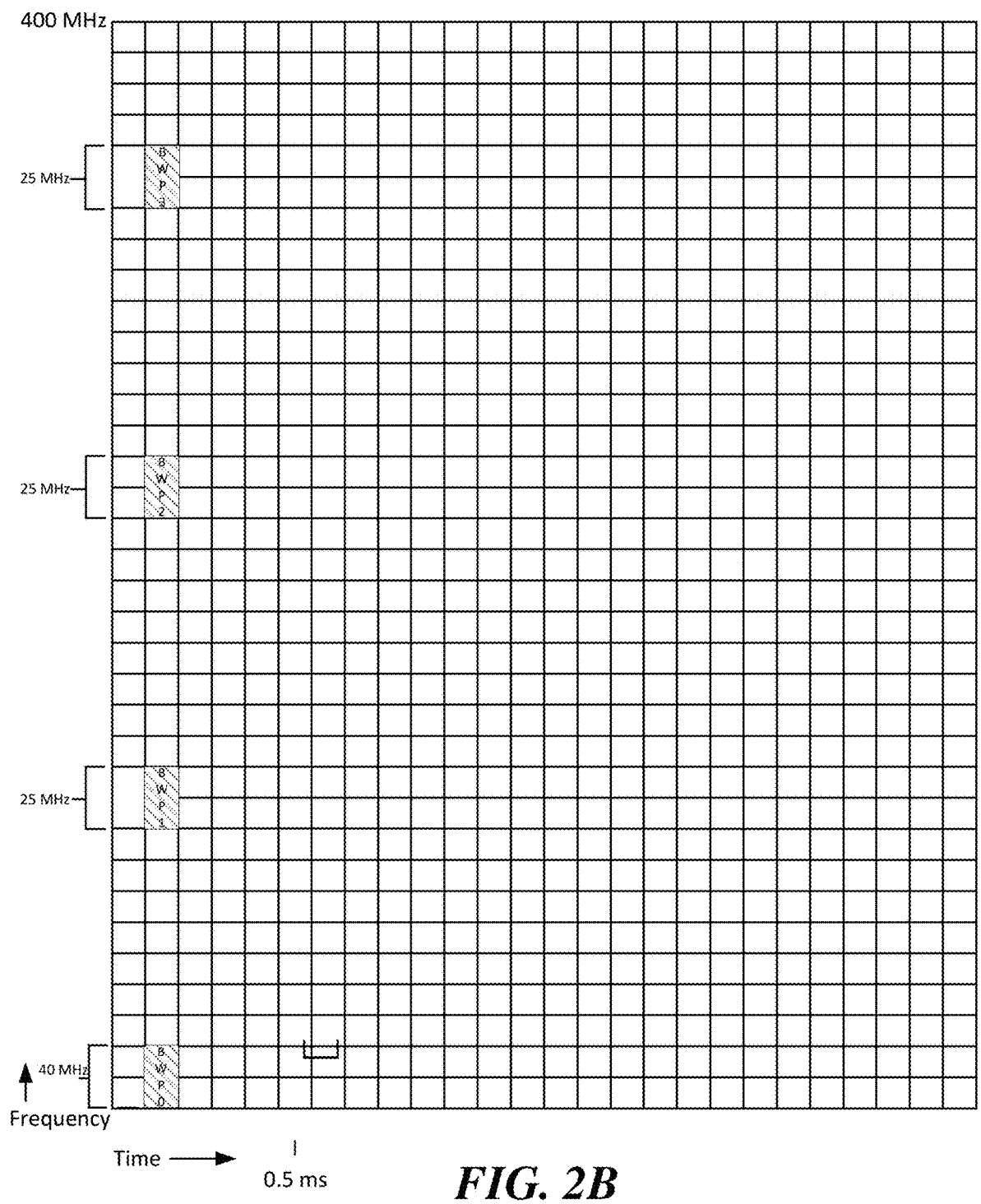
FIG. 2B is a diagram of a downlink resource grid illustrating a modified bandwidth part assignment to an emulated UE based on a change in assignment requested by the emulated UE.

As stated above, and as illustrated in Table 2, the bandwidth capability of an emulated UE may vary over time. Such an emulated capability may be desirable to emulate the behavior of real UEs that decrease bandwidth utilization to conserve battery life. For example, a UE may decrease its bandwidth capability from 50 to 25 MHz and communicate this capability to DUT 102. If DUT 102 is operating properly, DUT 102 will decrease the width of the bandwidth parts allocated to the UE to correspond to the newly advertised bandwidth capability. FIGS. 2A and 2B illustrate an example of a decrease in bandwidth capability that may be emulated by multi-UE bandwidth part and numerology capability emulator 108 to test the functionality of DUT 102. Referring to FIG. 2A, the grid represents a downlink resource grid with an initial bandwidth part assignment of 50 MHz assigned to a given UE. In FIG. 2A, each column represents a downlink timeslot. Each row represents a portion of the downlink frequency bandwidth. In FIG. 2A, the UE is assigned 4 downlink bandwidth parts BWP0-BWP3. Each bandwidth part has a bandwidth of 50 MHz. For simplicity, numerologies are not illustrated. Such a bandwidth part allocation may be assigned by DUT 102 in response to an initial capability advertisement message from multi-UE bandwidth part and numerology capability emulator 108 indicating that the UE is capable of transmitting and receiving with a bandwidth of 50 MHz.

In order to emulate a UE that decreases its power utilization, multi-UE bandwidth part and numerology capability emulator 108 may transmit a UE capability update message to DUT 102. In this example, it is assumed that the UE capability update message indicates that the emulated UE from FIG. 2B now desires to transmit and receive with a bandwidth of 25 MHz and the updated capability is to start at downlink timeslot number 10. In FIG. 2B, at timeslot 10, the UE receives data and downlink bandwidth parts BWP0-BWP3 in timeslot 10. Each bandwidth part BWP0 through BWP3 has a bandwidth of 25 MHz. In response to receiving data in bandwidth parts BWP0-BWP3 with a bandwidth of 25 MHz at timeslot 10, multi-UE bandwidth part and numerology capability emulator 108 may indicate that the scheduling algorithm of DUT 102 properly responded to the request for decrease in bandwidth capabilities advertised by the emulated UE. If DUT 102 responded incorrectly to the updated bandwidth capability request, for example, by maintaining the bandwidth of 50 MHz in timeslot 10, multi-UE bandwidth part and numerology capability emulator 108 may indicate that the scheduling algorithm of DUT 102 is not functioning properly.

In yet another example, multi-UE bandwidth part and numerology capability emulator 108 may scan all of the resource blocks in a given timeslot to determine whether the downlink control information appears in one of the assigned bandwidth parts assigned to a given UE. For example, referring to FIG. 2B, multi-UE bandwidth part and numerology capability emulator 108 may scan the entire 400 MHz bandwidth in timeslot 10. If the downlink control information appears in the frequency range corresponding to one of bandwidth parts BWP0 through BWP3, the scheduling algorithm for DUT 102 may be determined to be operating correctly. If multi-UE bandwidth part and numerology capability emulator 108 determines that the DCI in timeslot 10 is outside of bandwidth parts BWP0 through BWP3, the scheduling algorithm of DUT 102 may be determined to be operating incorrectly.

Figure 3:
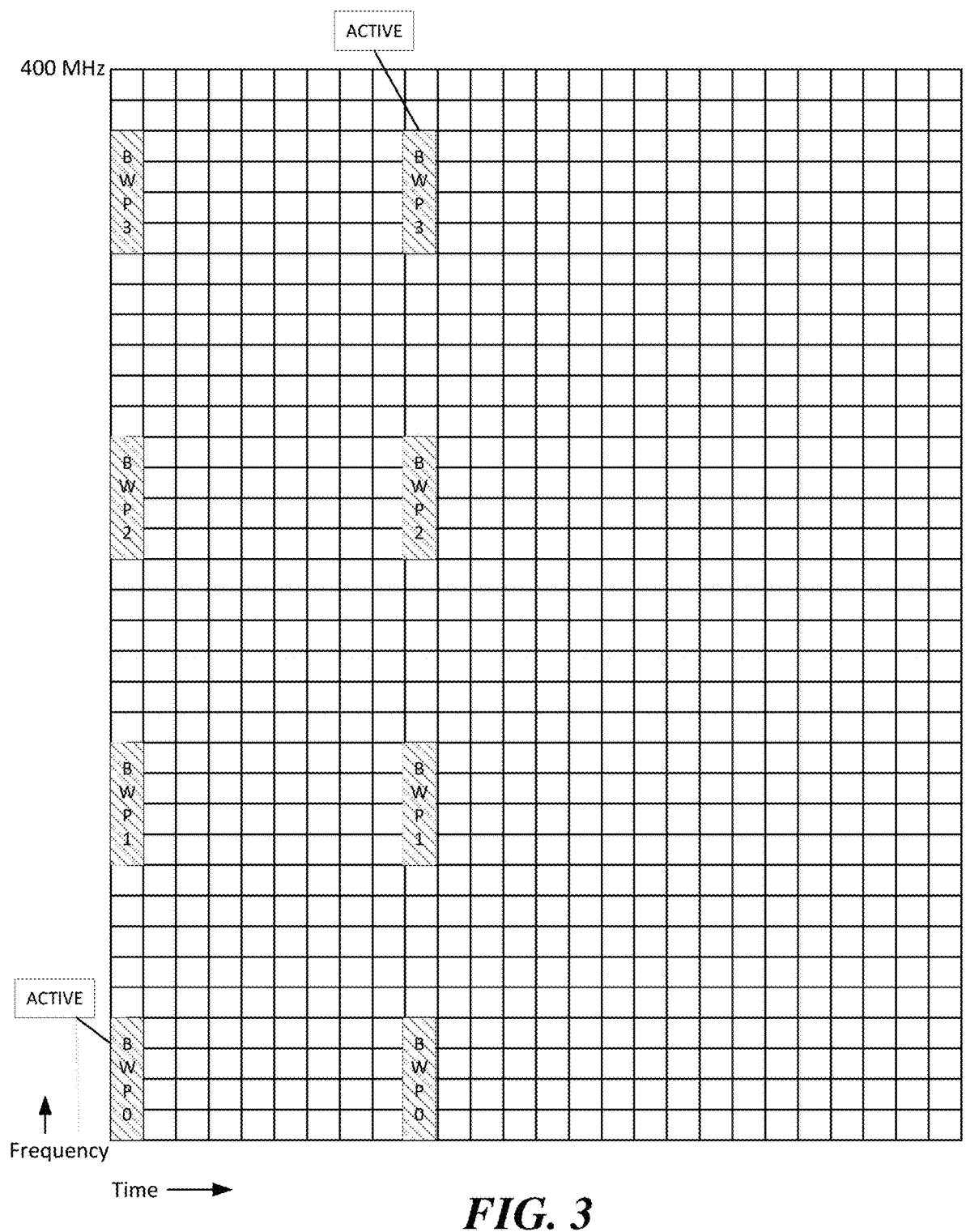
FIG. 3 is a diagram of a downlink resource grid illustrating switching active bandwidth parts for an emulated UE.

According to another aspect of the subject matter described herein, multi-UE bandwidth and numerology capability emulator 108 may identify a set of bandwidth parts assigned to an emulated UE for a downlink timeslot, identify an active bandwidth part for the downlink timeslot, detect switching of the active bandwidth part for a subsequent downlink timeslot, and generate an indication of the switching of the active bandwidth part. For example, referring to FIG. 3, during timeslot 1, a UE is assigned bandwidth parts BWP0-BWP3, and BWP0 is assigned as the active bandwidth part in timeslot 1. Multi-UE bandwidth and numerology capability emulator 108 may decode the downlink control information in timeslot 10 and determine that the active bandwidth part is BWP3. Multi-UE bandwidth and numerology emulator 108 may then analyze the resource blocks in bandwidth part BWP3 to determine whether the bandwidth parts contain valid data formatted according to 3GPP standards. If the resource blocks in bandwidth part BWP3 contain valid data, multi-UE bandwidth and numerology capability emulator 108 may determine that DUT 102 correctly implements switching between active bandwidth parts.

According to another aspect of the subject matter described herein, multi-UE bandwidth and numerology capability emulator 108 may identify a set of bandwidth parts assigned to an emulated UE for an uplink timeslot, identify an active bandwidth part for the uplink timeslot, detect switching of the active bandwidth part for a subsequent uplink timeslot, and generate an indication of the switching of the active bandwidth part. For example, referring to FIG. 3, during timeslot 1, a UE is assigned bandwidth parts BWP0-BWP3, and BWP0 is assigned as the active bandwidth part in timeslot 1. Multi-UE bandwidth and numerology capability emulator 108 may decode the downlink control information in timeslot 10 and determine that the active bandwidth part is BWP3. Multi-UE bandwidth and numerology emulator 108 may then utilize the resource blocks in uplink bandwidth part BWP3 to communicate with DUT 102 and analyze data in subsequent downlink resource blocks assigned to the UE from DUT 102 to determine whether DUT 102 correctly received the data in BWP3. If multi-UE bandwidth and numerology capability emulator 108 determines that the uplink data was validly received, multi-UE bandwidth and numerology capability emulator 108 may determine that DUT 102 correctly implements switching between active uplink bandwidth parts.

Figure 4:
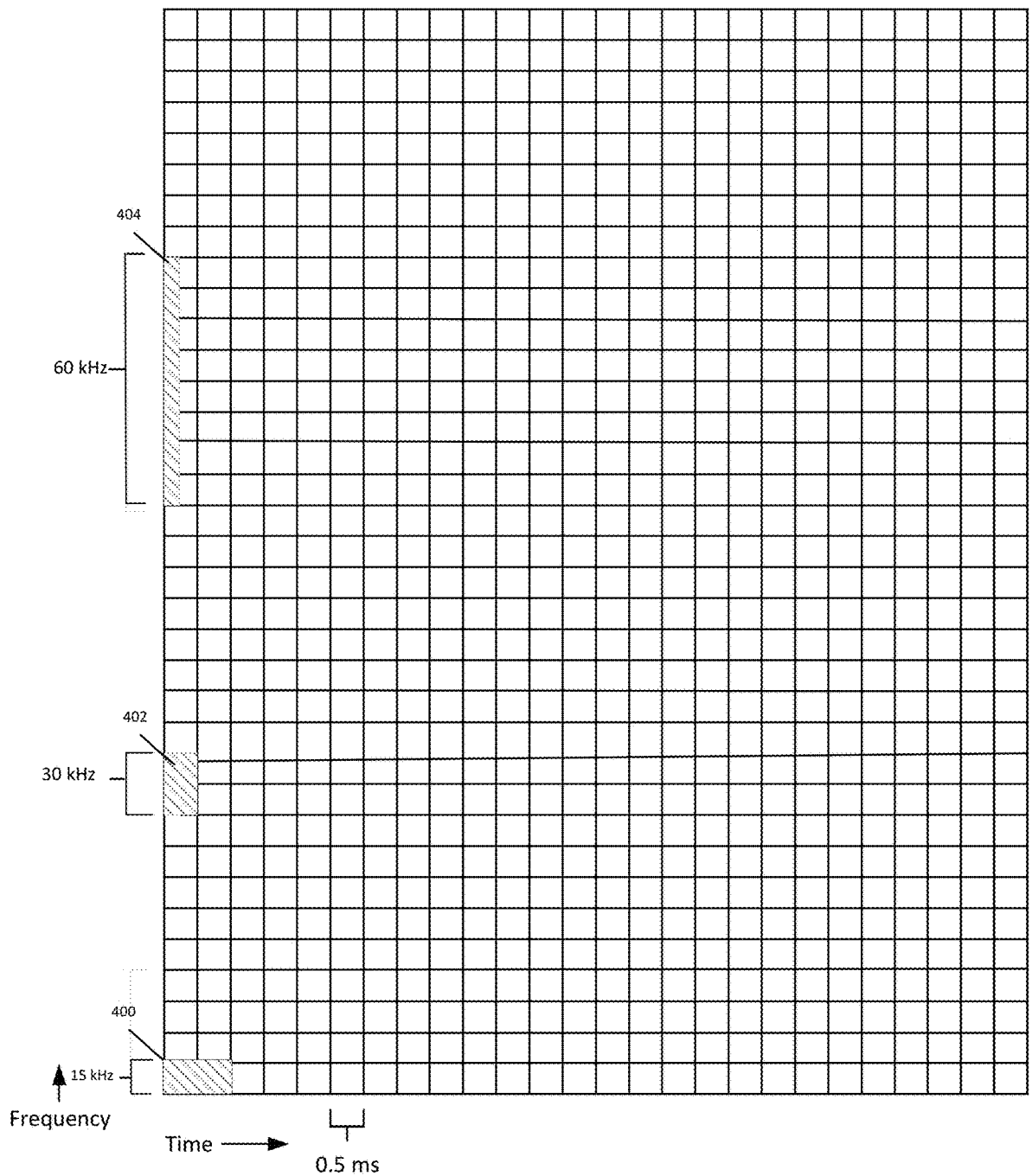
FIG. 4 is a diagram of a downlink resource grid illustrating emulation of UEs with different numerology capabilities.

According to another aspect of the subject matter described herein, multi-UE bandwidth and numerology capability emulator 108 may emulate UEs with different numerologies. FIG. 4 illustrates this concept. In FIG. 4, bandwidth part BWP 400 may be assigned to UE 1 and may have a numerology of 0, which corresponds to a subcarrier spacing of 15 kHz and one physical resource block per downlink timeslot. BWP 402 may be assigned to UE 2 and may have a numerology of 1, corresponding to a subcarrier spacing of 30 kHz and two physical resource blocks per downlink timeslot. BWP 404 may be assigned to UE 3 and may have a numerology of 2, corresponding to a subcarrier spacing of 60 kHz, and 4 physical resource blocks per downlink timeslot. Bandwidth and numerology capability emulator 108 may advertise numerology capabilities of UEs 1-3 to DUT 102, decode bandwidth part assignments for UEs 1-3, and determine whether the numerologies in the bandwidth part assignments correspond to those advertised to DUT 102.

Figure 5:
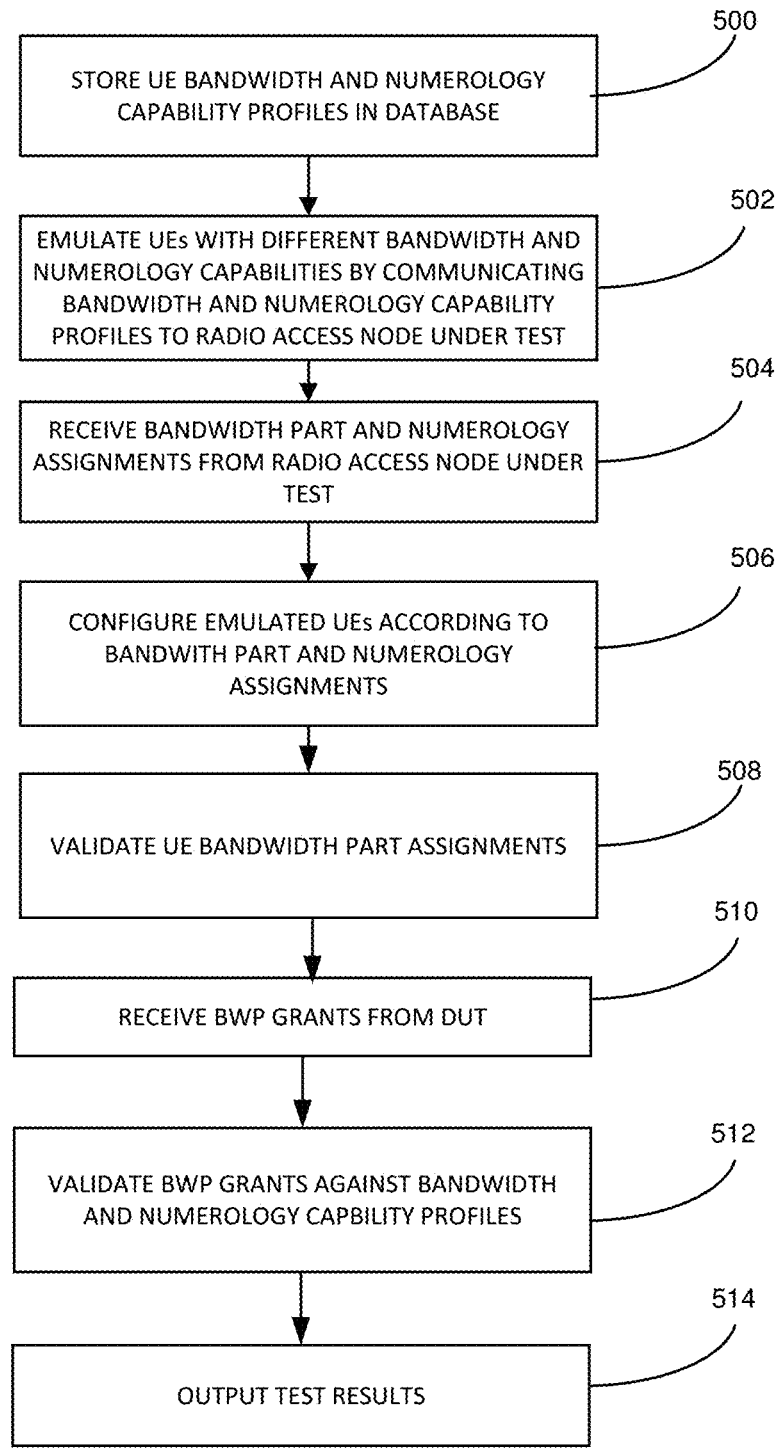
FIG. 5 is a flow chart illustrating an exemplary process for testing a radio access network node under test by emulating UEs with different bandwidth and numerology capabilities.

FIG. 5 is a flow chart illustrating an exemplary process for testing a radio access network mode by emulating UEs with different bandwidth and numerology capabilities. Referring to FIG. 5, in step 500, the method or process includes storing emulated UE bandwidth and numerology profiles for modeling UE bandwidth and numerology capabilities. For example, multi-UE bandwidth and numerology capability emulator 108 may store UE bandwidth and numerology capability profiles in database 111 of radio access network node test device 100. The profiles may include different bandwidths and numerologies to be implemented by different UEs and bandwidths and numerologies for the same UE that vary over time.

In step 502, UEs with different bandwidth and numerology capabilities are emulated by communicating the bandwidth and numerology capability profiles to a radio access network node under test. For example, multi-UE bandwidth and numerology capability emulator 108 may communicate, over an uplink interface or channel, bandwidth and numerology capabilities to DUT 102 using capability and capability update messages transmitted from multi-UE bandwidth and numerology capability emulator 108 to DUT 102.

In step 504, UE bandwidth part and numerology assignments are received from the radio access network node under test. For example, multi-UE bandwidth and numerology capability emulator 108 may receive an RRC config message from DUT 102 that contains bandwidth parts and numerology assignments.

In step 506, emulated UEs are configured according to the bandwidth part and numerology assignments received from the radio access network node under test. For example, multi-UE bandwidth and numerology capability emulator 108 may configure each emulated UE to monitor data in the bandwidth parts and with subcarrier spacings corresponding to the bandwidth part and numerology assignments received from DUT 102.

In step 508, UE bandwidth part assignments are validated. For example, multi-UE bandwidth and numerology capability emulator 108 may determine whether the requested bandwidth and numerology assignments correspond to those communicated to DUT 102.

In step 510, bandwidth part grants are received from the device under test. For example, multi-UE bandwidth part and numerology capability emulator 108 may receive bandwidth grants for emulated UEs in each timeslot of downlink communications from DUT 102. The grants are communicated to multi-UE and numerology capability emulator 108 in downlink control information received from DUT 102. Multi-UE bandwidth part and numerology capability emulator 108 may decode the downlink control information to identify the bandwidth parts and numerologies granted to each emulated UE. Decoding the downlink control information may include using the radio network terminal identifiers (RNTIs) of the emulated UEs to decode the downlink signal and identify the control information for each emulated UE. The downlink control information specifies the allocation of bandwidth parts for each emulated UE.

In step 512, the bandwidth grants are validated against the bandwidth part assignments. For example, multi-UE bandwidth and numerology capability emulator 108 may determine whether the received bandwidth grants identified by the downlink control information correspond to the assigned bandwidth parts received in the RRC config message.

In step 514, test results are output to the user. The test results may indicate whether the gNB under test properly scheduled downlink and uplink grants according to bandwidth and numerology capabilities communicated to DUT 102 for each emulated UE.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for testing a radio access network node using emulated UEs with varying bandwidth and numerology capabilities, the method comprising:
    storing, in a database, emulated UE bandwidth and numerology capability profiles for modeling UEs with different bandwidth and numerology capabilities;
    emulating plural UEs with different bandwidth part and numerology capabilities by communicating over, an uplink interface, the bandwidth and numerology capability profiles to a radio access network node under test;
    receiving, over a downlink interface, UE bandwidth part and numerology assignments from the radio access network node under test; and
    validating the UE bandwidth part and numerology assignments with respect to the bandwidth and numerology capabilities communicated to the radio access network node under test.

2. The method of claim 1 wherein storing the bandwidth and numerology capability profiles includes storing different bandwidth and numerology capability profiles for different emulated UEs.

3. The method of claim 1 wherein storing the different bandwidth and numerology capability profiles includes storing a bandwidth and numerology capability profile for a single emulated UE or a group of UEs in which the bandwidth capability of the emulated UE or group of UEs changes with time.

4. The method of claim 1 wherein validating the UE bandwidth and numerology assignments includes comparing the assignments to bandwidth capabilities communicated to the radio access network node under test.

5. The method of claim 1 comprising receiving bandwidth part grants from the radio access network node under test and validating the grants.

6. The method of claim 5 wherein validating the grants includes decoding downlink control information in downlink signals received from the radio access network node under test, identifying bandwidth parts and assigned to the emulated UEs, and determining whether the bandwidth parts identified from the downlink control information correspond to the bandwidth and numerology assignments.

7. The method of claim 1 comprising analyzing downlink signals to determine whether downlink control information is transmitted outside of allocated bandwidth parts.

8. The method of claim 1 comprising identifying a set of bandwidth parts assigned to an emulated UE for a downlink timeslot, identifying an active bandwidth part for the downlink and uplink timeslot, detecting switching of the active bandwidth part for a subsequent downlink and uplink timeslot, and generating an indication of the switching of the active bandwidth part.

9. The method of claim 1 wherein emulating UEs with different bandwidth part and numerology capabilities includes emulating plural UEs with different numerology capabilities.

10. The method of claim 1 wherein the radio access network node under test comprises a g-node B (gNB).

11. A system for testing a radio access network node using emulated UEs with varying bandwidth and numerology capabilities, the system comprising:
  a radio access network node test device including at least one processor and a memory;
  a database of emulated UE bandwidth and numerology capability profiles stored in the memory for modeling UEs with different bandwidth and numerology capabilities; and
  a multi-UE bandwidth and numerology capability emulator implemented by the at least one processor for emulating plural UEs with different bandwidth part and numerology capabilities by communicating, over an uplink interface, the bandwidth and numerology capability profiles to a radio access network node under test, receiving, over a downlink interface, UE bandwidth part and numerology assignments from the radio access network node under test, and validating the UE bandwidth part and numerology assignments with respect to the bandwidth and numerology capabilities communicated to the radio access network node under test.

12. The system of claim 11 wherein storing the bandwidth and numerology capability profiles include storing different bandwidth and numerology capability profiles for different emulated UEs.

13. The system of claim 11 wherein the database is configured to store a bandwidth and numerology capability profile for a single emulated UE or a group of UEs in which the bandwidth capability of the emulated UE or group of UEs that changes with time and wherein the multi-UE bandwidth and numerology capability emulator is configured to use the stored profile to emulate a single UE or group of UEs having a bandwidth capability that changes with time.

14. The system of claim 11 wherein the multi-UE bandwidth and numerology capability emulator is configured to compare the assignments to the bandwidth capabilities communicated to the radio access network node under test.

15. The system of claim 11 wherein the multi-UE bandwidth and numerology capability emulator is configured to receive bandwidth part grants from the radio access network node under test and validate the grants.

16. The system of claim 15 wherein the multi-UE bandwidth and numerology capability emulator is configured to decode downlink control information in downlink signals received from the radio access network node under test, identify bandwidth parts and assigned to the emulated UEs, and determine whether the bandwidth parts identified from the downlink control information correspond to the bandwidth and numerology assignments.

17. The system of claim 11 wherein the multi-UE bandwidth and numerology capability emulator is configured to analyze downlink signals to determine whether downlink control information is transmitted outside of allocated bandwidth parts.

18. The system of claim 11 wherein the multi-UE bandwidth and numerology capability emulator is configured to identify a set of bandwidth parts assigned to an emulated UE for a downlink and uplink timeslot, identify an active bandwidth part for the downlink timeslot, detect switching of the active bandwidth part for a subsequent downlink and uplink timeslot, and generate an indication of the switching of the active bandwidth part.

19. The system of claim 11 wherein the multi-UE bandwidth and numerology capability emulator is configured to emulate plural UEs with different numerology capabilities.

20. A non-transitory computer readable medium having stored thereon executable instructions that when executed by a processor of a computer control the computer to perform steps comprising:
  storing, in a database, emulated UE bandwidth and numerology capability profiles in memory for modeling UEs with different bandwidth and numerology capabilities;
  emulating plural UEs with different bandwidth part and numerology capabilities by communicating, over an uplink interface, the bandwidth and numerology capability profiles to a radio access network node under test;
  receiving, over a downlink interface and from the radio access network node under test, UE bandwidth part and numerology assignments; and
  validating the UE bandwidth part and numerology assignments with respect to the bandwidth and numerology capabilities communicated to the radio access network node under test.

* * * * *